United States Patent
Oh et al.

(10) Patent No.: US 10,986,619 B2
(45) Date of Patent: Apr. 20, 2021

(54) METHOD AND APPARATUS FOR DETERMINING UPLINK TRANSMISSION TIMING IN WIRELESS COMMUNICATION SYSTEM

(71) Applicant: Samsung Electronics Co., Ltd., Suwon-si (KR)

(72) Inventors: Jinyoung Oh, Seoul (KR); Jeongho Yeo, Hwaseong-si (KR); Sungjin Park, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/963,261

(22) Filed: Apr. 26, 2018

(65) Prior Publication Data
US 2018/0317206 A1 Nov. 1, 2018

(30) Foreign Application Priority Data

Apr. 26, 2017 (KR) .................. 10-2017-0053551

(51) Int. Cl.
| | |
|---|---|
| *H04W 72/04* | (2009.01) |
| *H04W 16/14* | (2009.01) |
| *H04W 72/12* | (2009.01) |

(52) U.S. Cl.
CPC ......... *H04W 72/042* (2013.01); *H04W 16/14* (2013.01); *H04W 72/1268* (2013.01); *H04W 72/1289* (2013.01)

(58) Field of Classification Search
CPC ............... H04W 16/14; H04W 72/042; H04W 72/1268; H04W 72/1289; H04W 72/0446; H04W 72/0413; H04W 72/14; H04W 72/0453; H04W 72/1284; H04W 72/1263; H04W 76/10; H04W 16/26; H04W 72/04;
(Continued)

(56) References Cited

U.S. PATENT DOCUMENTS

| | | |
|---|---|---|
| 2016/0143008 A1 | 5/2016 | Lee et al. |
| 2016/0302176 A1 | 10/2016 | Ahn et al. |

(Continued)

FOREIGN PATENT DOCUMENTS

WO     2017/064004 A1     4/2017

OTHER PUBLICATIONS

Nokia et al., 'WF on Latency Reduction configuration for 1ms TTI including CA aspects', R1-1706402, 3GPP TSG RAN1 Meeting #88bis, Apr. 9, 2017.

(Continued)

*Primary Examiner* — Awet Haile
(74) *Attorney, Agent, or Firm* — Jefferson IP Law, LLP

(57) ABSTRACT

A communication method and system are provided for converging a 5th-generation (5G) communication system for supporting higher data rates beyond a 4th-generation (4G) system with a technology for Internet of things (IoT). The communication method and system may be applied to intelligent services based on the 5G communication technology and the IoT-related technology, such as smart home, smart building, smart city, smart car, connected car, health care, digital education, smart retail, security and safety services. A wireless communication system, and more particularly, a method and device for determining uplink signal transmission timing is provided.

16 Claims, 9 Drawing Sheets

(58) Field of Classification Search
CPC ....... H04L 5/0091; H04L 1/0061; H04L 1/18; H04L 5/0094
See application file for complete search history.

(56) References Cited

U.S. PATENT DOCUMENTS

| | | | |
|---|---|---|---|
| 2017/0079060 A1 | 3/2017 | Keating et al. | |
| 2018/0110031 A1* | 4/2018 | Yoshizawa | H04W 76/10 |
| 2018/0317244 A1* | 11/2018 | Um | H04L 5/1469 |
| 2019/0116006 A1* | 4/2019 | Lunttila | H04L 1/1854 |

OTHER PUBLICATIONS

International Search Report dated Aug. 9, 2018, issued in International Application No. PCT/KR2018/004846.
European Search Report dated Dec. 19, 2019, issued in European Application No. 18791243.1-1215 / 3574696.
3GPP TSG RAN WG1 Meeting #86. Samsung: "Overview of latency reduction operation with subframe TTI for FS3", R1-166694, XP051125517, Gothenburg, Sweden Aug. 21, 2016.
3GPP TSG RAN WG1 Meeting #87. SHARP: "Discussion on a timing issue on UL TPC for LAA SCell", R1-1612614, XP051176559, Reno, USA, Nov. 13, 2016.

\* cited by examiner

METHOD AND APPARATUS FOR DETERMINING UPLINK TRANSMISSION TIMING IN WIRELESS COMMUNICATION SYSTEM

CROSS-REFERENCE TO RELATED APPLICATION(S)

This application is based on and claims priority under 35 U.S.C. § 119(a) of a Korean patent application number 10-2017-0053551, filed on Apr. 26, 2017, in the Korean Intellectual Property Office, the disclosure of which is incorporated by reference herein in its entirety.

BACKGROUND

1. Field

The disclosure relates to a wireless communication system. More particularly, the disclosure relates to a method and an apparatus for determining uplink signal transmission timing. More particularly, the disclosure relates to a method for determining uplink signal transmission timing of a terminal when a latency reduction mode is configured in a terminal supporting the latency reduction mode.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, Hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

The 5G system has considered a support for various services compared to the existing 4G system. For example, the most representative services are an enhanced mobile broadband (eMBB) communication service, an ultra-reliable and low latency communication (URLLC) service, a massive machine type communication (mMTC) service, an evolved multimedia broadcast/multicast service (eMBMS), etc. Further, a system providing the URLLC service may be referred to as an URLLC system, a system providing the eMBB service may be referred to as an eMBB system, and the like. In addition, the terms "service and system" may be interchangeably used with each other.

In a wireless communication system, in particular, in a conventional LTE system, a terminal transmits HARQ ACK or NACK information to a base station whether to notify a success of data transmission in an uplink after 3 ms after receiving downlink data. For example, HARQ ACK/NACK information of a physical downlink shared channel (PDSCH) received from the base station to the terminal in subframe n is transmitted to the base station on a physical uplink control channel (PUCCH) or a physical uplink shared channel (PUSCH) in subframe n+4. In addition, in the FDD LTE system, the base station may transmit downlink control information (DCI) including uplink resource allocation information to the terminal, or the base station may request a retransmission on a physical hybrid ARQ indicator channel (PHICH). When the terminal receives the uplink data transmission scheduling in the subframe n as described above, the terminal performs the uplink data transmission in the subframe n+4. That is, the PUSCH transmission is performed in the subframe n+4. The above example is described in the LTE system using the FDD. In the LTE system using the TDD, the HARQ ACK/NACK transmission timing or the PUSCH transmission timing is different according to the UL-DL subframe configuration, which is performed according to the predetermined rule.

In the LTE system using the FDD or the TDD, the HARQ ACK/NACK transmission timing or the PUSCH transmission timing is a predetermined timing according to the case that the time required for signal processing of the base station and the terminal is about 3 ms. However, if the LTE base station and the terminal reduce the signal processing time to 1 ms or 2 ms, it is possible to reduce the delay time for the data transmission.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for determining uplink signal transmission timing when a terminal supporting a transmission for reducing a delay time is configured in a latency reduction mode.

Additional aspects will be set forth in part in the description which follows and, in part, will be apparent from the description, or may be learned by practice of the presented embodiments.

In accordance with an aspect of the disclosure, a method for transmitting an uplink signal of a terminal in a communication system is provided. The method includes receiving configuration information on a latency reduction mode from a base station, receiving downlink control information scheduling an uplink data, and transmitting the uplink data to the base station using an unlicensed band based on the downlink control information, wherein the downlink control information includes timing offset information, and the uplink data is transmitted at timing determined based on the timing offset information and transmission timing according to a latency reduction mode.

An interval between a subframe in which the downlink control information is received and a subframe in which the uplink data is transmitted may be a sum of 3 and a value indicated by the timing offset information, the timing offset information may indicate one of 0 to 15, and the downlink control information may correspond to a downlink control information format 0A, 0B, 4A or 4B.

In accordance with another aspect of the disclosure, a method for receiving an uplink signal of a base station in a communication system is provided. The method includes transmitting configuration information on a latency reduction mode to a terminal, transmitting downlink control information scheduling an uplink data, and receiving the uplink data from the terminal using an unlicensed band based on the downlink control information, wherein the downlink control information includes timing offset information, and the uplink data is transmitted at timing determined based on the timing offset information and transmission timing according to a latency reduction mode.

In accordance with another aspect of the disclosure, a terminal transmitting an uplink signal in a communication system is provided. The terminal includes a transceiver, and at least one processor coupled with the transceiver and configured to control to receive configuration information on a latency reduction mode from a base station, receive downlink control information scheduling an uplink data, and transmit the uplink data to the base station using an unlicensed band based on the downlink control information, wherein the downlink control information includes timing offset information, and the uplink data is transmitted at timing determined based on the timing offset information and transmission timing according to a latency reduction mode.

In accordance with another aspect of the disclosure, a base station receiving an uplink signal in a communication system is provided. The base station includes a transceiver, and at least one processor coupled with the transceiver and configured to control to transmit configuration information on a latency reduction mode to a terminal, transmit downlink control information scheduling an uplink data, and receive the uplink data from the terminal using an unlicensed band based on the downlink control information, wherein the downlink control information includes timing offset information, and the uplink data is transmitted at timing determined based on the timing offset information and transmission timing according to a latency reduction mode.

As described above, according to the disclosure, it is possible to effectively operate a resource by decoding the control signal in the latency reduction mode operation of the base station and the terminal and providing the transmission/reception method according to the decoded control signal.

The effects that may be achieved by the various embodiments of the disclosure are not limited to the above-mentioned aspects. That is, other effects that are not mentioned may be obviously understood by those skilled in the art to which the disclosure pertains from the following description.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
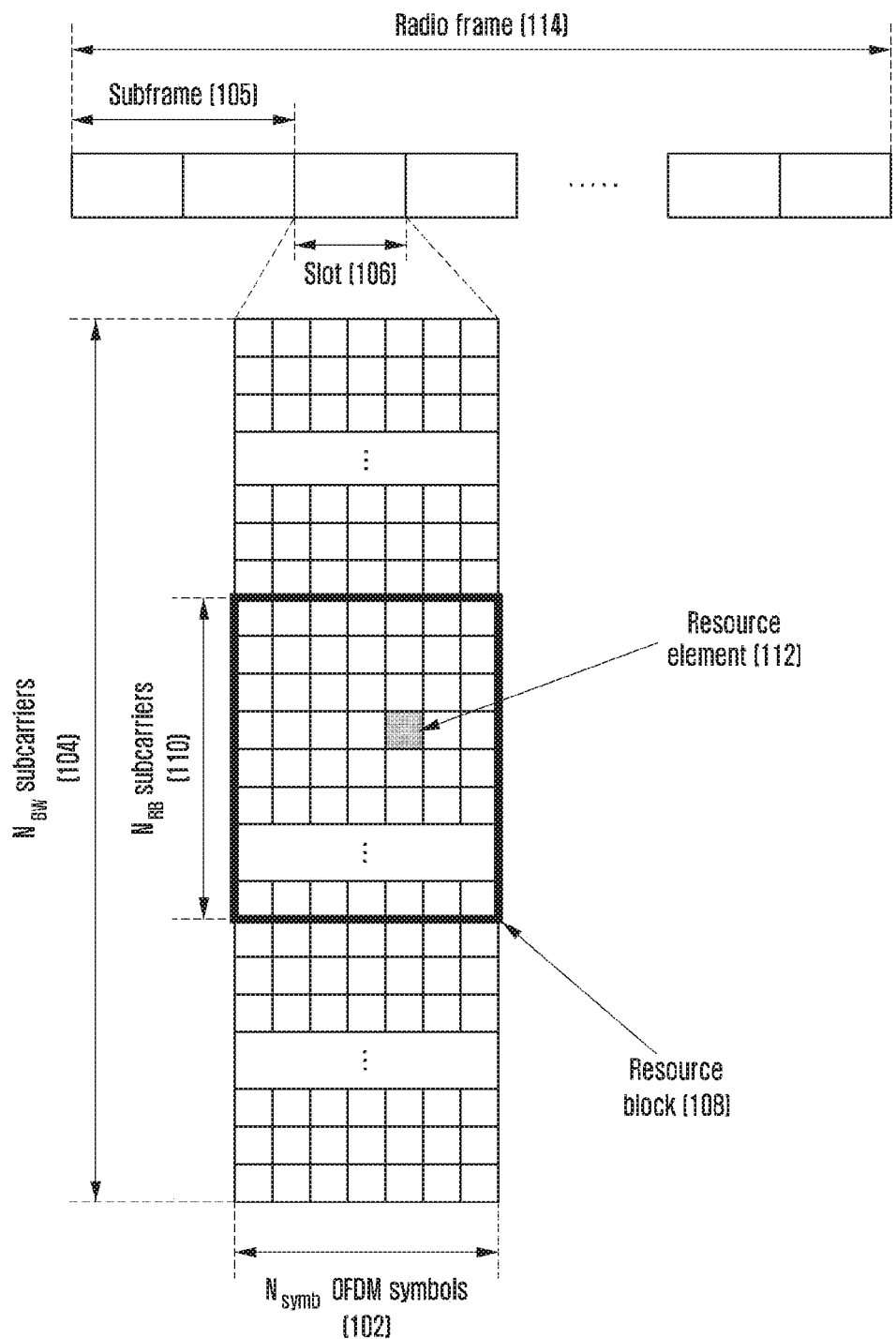
FIG. 1 is a diagram illustrating a structure of a downlink resource region in an LTE system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

To meet a demand for radio data traffic that is on an increasing trend since commercialization of a 4G communication system, efforts to develop an improved 5G communication system or a pre-5G communication system have been conducted. For this reason, the 5G communication system or the pre-5G communication system is called a beyond 4G network communication system or a post LTE system. To achieve a high data transmission rate, the 5G communication system is considered to be implemented in a very high frequency (mmWave) band (e.g., like 60 GHz band). To relieve a path loss of a radio wave and increase a transfer distance of the radio wave in the very high frequency band, in the 5G communication system, beamforming, massive multiple-input multiple-output (MIMO), full dimensional MIMO (FD-MIMO), array antenna, analog beam-forming, and large scale antenna technologies have been discussed. Further, to improve a network of the system, in the 5G communication system, technologies such as an evolved small cell, an advanced small cell, a cloud radio access network (cloud RAN), an ultra-dense network, a device to device communication (D2D), a wireless backhaul, a moving network, cooperative communication, coordinated multi-points (CoMP), and reception interference cancellation have been developed. In addition to this, in the 5G system, hybrid FSK and QAM modulation (FQAM) and sliding window superposition coding (SWSC) that are an advanced coding modulation (ACM) scheme and a filter bank multi carrier (FBMC), a non orthogonal multiple access (NOMA), and a sparse code multiple access (SCMA) that are an advanced access technology, and so on have been developed.

Meanwhile, the Internet is evolved from a human-centered connection network through which a human being generates and consumes information to the Internet of things (IoT) network that transmits/receives information between distributed components such as things and processes the information. The Internet of everything (IoE) technology in which the big data processing technology, etc. is combined with the IoT technology by connection with a cloud server, etc. has also emerged. To implement the IoT, technology elements, such as a sensing technology, wired and wireless communication and network infrastructure, a service interface technology, and a security technology, have been required. Recently, technologies such as a sensor network, machine to machine (M2M), and machine type communication (MTC) for connecting between things have been researched. In the IoT environment, an intelligent Internet technology (IT) service that creates a new value in human life by collecting and analyzing data generated in the connected things may be provided. The IoT may apply for fields, such as a smart home, a smart building, a smart city, a smart car or a connected car, a smart grid, health care, smart appliances, and an advanced healthcare service, by fusing and combining the existing information technology (IT) with various industries.

Therefore, various tries to apply the 5G communication system to the IoT network have been conducted. For example, technologies such as the sensor network, the machine to machine (M2M), and the machine type communication (MTC), have been implemented by techniques such as the beamforming, the MIMO, and the array antenna that are the 5G communication technologies. The application of the cloud radio access network (cloud RAN) as the big data processing technology described above may also be considered as an example of the fusing of the 5G communication technology with the IoT technology.

As described above, a plurality of services can be provided to a user in the communication system, and a method capable of providing each service within the same time interval in accordance with characteristics to provide a plurality of services to users and an apparatus using the same are required.

Hereinafter, embodiments of the disclosure will be described in detail with reference to the accompanying drawings.

In describing the embodiments of the disclosure, a description of technical contents which are well known to the art to which the disclosure belongs and are not directly connected with the disclosure will be omitted. This is to more clearly transfer a gist of the disclosure by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the disclosure and methods accomplishing the same will become apparent from the following detailed description of embodiments with reference to the accompanying drawings. However, the disclosure is not limited to the embodiments disclosed herein but will be implemented in various forms. The embodiments have made disclosure of the disclosure complete and are provided so that those skilled in the art can easily understand the scope of the disclosure. Therefore, the disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a non-transitory computer usable or computer readable memory of a computer or other programmable data processing apparatuses in order to implement the functions in a specific scheme, the computer program instructions stored in the non-transitory computer usable or computer readable memory may also produce manufacturing articles including instruction means performing the functions described in block(s) of the flow charts. Since the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate some of modules, segments, or codes including one or more executable instructions for executing a specific logical function (s). Further, it is to be noted that functions mentioned in the blocks occur regardless of a sequence in some alternative embodiments. For example, two blocks that are contiguously illustrated may be simultaneously performed in fact or be performed in a reverse sequence depending on corresponding functions sometimes.

Here, the term '-unit' used in the embodiment means software or hardware components such as FPGA and ASIC and the '~unit' performs any roles. However, the meaning of the '~unit' is not limited to software or hardware. The '~unit' may be configured to be in a storage medium that may be addressed and may also be configured to reproduce one or more processor. Accordingly, for example, the '~unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the '~units' may be combined with a smaller number of components and the '~units' or may be further separated into additional components and '~units'. In addition, the components and the '~units' may also be implemented to reproduce one or more CPUs within a device or a security multimedia card. Further, in an embodiment, '~unit' may include one or more processors.

A wireless communication system has been developed from a wireless communication system providing a voice centered service in the early stage toward broadband wireless communication systems providing high-speed, high-quality packet data services, such as communication standards of high speed packet access (HSPA) and long term evolution (LTE) or evolved universal terrestrial radio access (E-UTRA) of the 3GPP, high rate packet data (HRPD) and ultra mobile broadband (UMB) of 3GPP2, 802.16e of IEEE or the like. In addition, the 5G or new radio (NR) communication standards are being produced as the 5G wireless communication system.

In a wireless communication system including the 5G, at least one service of enhanced mobile broadband (eMBB), massive machine type communications (mMTC), and ultra-reliable and low latency communications (URLLC) may be provided to the terminal. The services can be provided to the same terminal during the same time period. In the following embodiments, the eMBB is a high speed transmission of high capacity data, the mMTC is terminal power minimization and connection of a plurality of terminals, and the URLLC may be a service aiming at high reliability and low latency, which is not limited thereto. The above three services may be a major scenario in an LTE system or in systems such as 5G/NR (new radio, next radio) since the LTE. In the embodiment, a coexistence method of eMBB and URLLC, a coexistence method of mMTC and URLLC, and an apparatus using the same will be described.

When the base station schedules data corresponding to the eMBB service in a specific transmission time interval (TTI) to any terminal, if the situation where the URLLC data need to be transmitted in the TTI occurs, some of the eMBB data are not transmitted in a frequency bandwidth in which the eMBB data are already scheduled and transmitted and the URLLC data are transmitted in the frequency band. The terminal that receives the scheduled eMBB and the terminal that receives the scheduled URLLC may be the same terminal or may be different terminals. In this case, since a part where some of the eMBB data that are scheduled and transmitted in advance are not transmitted occurs, the eMBB data is highly likely to be damaged. Therefore, in the above case, it is necessary to determine a method for processing a signal received from a terminal that receives scheduling for eMBB or a terminal that receives scheduling for URLLC and a signal receiving method. Therefore, according to the embodiment, when the information according to the eMBB and the URLLC is scheduled by sharing some or the whole of the frequency band, the information according to the mMTC and the URLLC is scheduled simultaneously, the information according to the mMTC and the eMBB is scheduled simultaneously, or the information according to the eMBB, the URLLC, and the mMTC and eMBB is scheduled simultaneously, a coexistence method between heterogeneous services that can transmit the information according to each service will be described.

Hereinafter, embodiments of the disclosure will be described in detail with reference to the accompanying drawings. When it is decided that a detailed description for the known function or configuration related to the disclosure may obscure the gist of the disclosure, the detailed description therefor will be omitted. Further, the following terminologies are defined in consideration of the functions in the disclosure and may be construed in different ways by the intention or practice of users and operators. Therefore, the definitions thereof should be construed based on the contents throughout the specification.

Hereinafter, the base station is a subject performing resource allocation of a terminal and may be at least one of eNode B, Node B, a base station (BS), a wireless access unit, a base station controller, and a node on a network. The UE may include user equipment (UE), a mobile station (MS), a cellular phone, a smart phone, a computer, or a multimedia system performing a communication function. In the disclosure, a downlink (DL) means a radio transmission path of a signal from a base station to a terminal and an uplink (UL) means a radio transmission path through which the terminal is transmitted to the base station. Further, as an example of LTE or an LTE-A system, an embodiment of the disclosure is described below, but the embodiment of the disclosure may be applied to other communication systems having similar technical background or a channel form. For example, 5G mobile communication technologies (5G, new radio (NR)) developed after the LTE-A could be included. Further, embodiments of the disclosure may be applied even to other communication systems by partially being changed without greatly departing from the scope of the disclosure under the decision of those skilled in the art.

As a representative example of the broadband wireless communication system, the LTE system has adopted an orthogonal frequency division multiplexing (OFDM) scheme in a DL and has adopted a single carrier frequency division multiple access (SC-FDMA) scheme in an UL. The uplink refers to a radio link through which a terminal (user equipment (UE)) or a mobile station (MS) transmits data or a control signal to a base station (eNodeB or base station (BS)) and the down link refers to a radio link through which a base station transmits data or a control signal to a terminal. The multiple access scheme as described above normally allocates and operates time-frequency resources on which data or control information is transmitted to prevent the time-frequency resources from overlapping with each other, that is, establish orthogonality, thereby dividing the data or the control information of each user.

If a decoding failure occurs upon initial transmission, the LTE system has adopted a hybrid automatic repeat reQuest (HARQ) scheme of retransmitting the corresponding data in a physical layer. If a receiver does not accurately decode data, the HARQ scheme enables the receiver to transmit information (negative acknowledgement (NACK)) notifying the decoding failure to a transmitter to thereby enable the transmitter to retransmit the corresponding data in the physical layer. The receiver combines the data retransmitted by the transmitter with the data that are not decoded previously, thereby increasing reception performance of the data. Further, if the receiver accurately decodes the data, the receiver transmits information (acknowledgement (ACK)) notifying a decoding success to the transmitter so that the transmitter may transmit new data.

FIG. 1 is a diagram illustrating the basic structure of the time-frequency domain that is the radio resource area to which the data or the control channel is transmitted in a downlink of the LTE system or the system similar thereto according to an embodiment of the disclosure.

Referring to FIG. 1, an abscissa represents a time domain and an ordinate represents a frequency domain. A minimum transmission unit in the time domain is an OFDM symbol, in which one slot 106 is configured by collecting $N_{symb}$ OFDM symbols 102 and one subframe 105 is configured by collecting two slots. The slot length is 0.5 ms and the subframe length is 1.0 ms. Further, a radio frame 114 is a time domain interval consisting of 10 subframes. A minimum transmission unit in a frequency domain is a subcarrier, in which the entire system transmission bandwidth consists of a total of $N_{BW}$ subcarriers 104. However, such specific values can be applied variably.

A basic unit of resources in the time-frequency domain is a resource element (RE) 112 and may be represented by an OFDM symbol index and a subcarrier index. A resource block (RB) 108 (or physical resource block (PRB)) is defined by the $N_{symb}$ continued OFDM symbols 102 in the time domain and $N_{RB}$ continued subcarriers 110 in the frequency domain. Thus, one RB 108 in one slot may include $N_{symb} \times N_{RB}$ REs 112. In general, the minimum frequency-domain allocation unit of data is the RB, and in the LTE system, generally $N_{symb}=7$ and $N_{RB}=12$, and the $N_{BW}$ can be proportional to the bandwidth of the system transmission band. A data rate is increased in proportion to the number of RBs scheduled for the terminal.

In the LTE system, six transmission bandwidths may be defined and operated. In an FDD system operated by dividing the downlink and the uplink based on a frequency, a downlink transmission bandwidth and an uplink transmission bandwidth may be different from each other. A channel bandwidth represents an RF bandwidth corresponding to the system transmission bandwidth. The following Table 1 shows a correspondence relationship between the system transmission bandwidth and the channel bandwidth that are defined in the LTE system. For example, the LTE system having the channel bandwidth of 10 MHz is configured of a transmission bandwidth including 50 RBs.

TABLE 1

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

The downlink control information may be transmitted within first N OFDM symbols within the subframe. In the embodiment, generally, N={1, 2, 3}. Therefore, the N value may variably apply to each subframe depending on the amount of control information to be transmitted to the current subframe. The transmitted control information may include a control channel transmission section indicator representing over how many OFDM symbols the control information is transmitted, scheduling information on downlink data or uplink data, information on HARQ ACK/NACK, or the like.

In the LTE system, the scheduling information on the downlink data or the uplink data is transmitted from a base station to a terminal through downlink control information (DCI). The DCI is defined depending on various formats. Depending on each format, it may be changed whether the DCI is scheduling information (UL grant) on the uplink data or scheduling information (DL grant) on the downlink data, whether the DCI is compact DCI having small-sized control information, whether to apply spatial multiplexing using a multiple antenna, whether the DCI is DCI for a power control, or the like. For example, DCI format 1 that is the scheduling control information (DL grant) on the downlink data may include at least one of the following control information.

Resource allocation type 0/1 flag: It is indicated whether a resource allocation scheme is type 0 or type 1. The type 0 applies a bitmap scheme to assign a resource in a resource block group (RBG) unit. In the LTE system, a basic unit of the scheduling is the resource block (RB) represented by a time-frequency domain resource and the RBG consists of a plurality of RBs and thus becomes a basic unit of the scheduling in the type 0 scheme. The type 1 assigns a specific RB within the RBG.

Resource block allocation: The RB allocated to the data transmission is indicated. The represented resource is determined depending on the system bandwidth and the resource assignment scheme.

Modulation and coding scheme (MCS): The modulation scheme used for the data transmission and a size of a transport block that is data to be transmitted are indicated.

HARQ process number: An HARQ process number is indicated.

New data indicator: An HARQ initial transmission or retransmission is indicated.

Redundancy version: An HARQ redundancy version is indicated.

Transmit power control (TPC) command for physical uplink control channel (PUCCH): A transmit power control command for the PUCCH that is an uplink control channel is indicated.

The DCI is subjected to a channel coding and modulation process and then is transmitted on a physical downlink control channel (PDCCH) or an enhanced PDCCH (EPDCCH) that is the downlink physical control channel. Hereinafter, the PDCCH or EPDCCH transmission/reception may be interchangeably used with DCI transmission/reception, and such a technique may be applied even to other channels.

Generally, each DCI is independently scrambled with a specific radio network temporary identifier (RNTI) (or a terminal identifier) for each terminal to be added with a cyclic redundant check (CRC) bit, subjected to channel coding, and then configured of independent PDCCH to be transmitted. In the time domain, the PDCCH is transmitted while being mapped during the control channel transmission section. A mapping position in the frequency domain of the PDCCH is determined by identifiers (IDs) of each terminal and the PDCCH may be transmitted throughout the entire system transmission bandwidth.

The downlink data may be transmitted on a physical downlink shared channel (PDSCH) that is a physical channel for downlink data transmission. The PDSCH is transmitted after the control channel transmission section and the scheduling information on the detailed mapping location, the modulation scheme or the like of the downlink data in the frequency domain is determined based on the DCI transmitted on the PDCCH.

By the MCS among the control information configuring the DCI, the base station notifies the modulation scheme applied to the PDSCH to be transmitted to the terminal and a data size (transport block size (TBS)) to be transmitted. In the embodiments, the MCS may consist of 5 bits or bits larger or smaller than that. The TBS corresponds to a size before channel coding for error correction is applied to data (transport block (TB)) to be transmitted by a base station.

The modulation scheme supported in the LTE system is quadrature phase shift keying (QPSK), 16 quadrature amplitude modulation (16 QAM), and 64 QAM, in which each modulation order Qm corresponds to 2, 4, and 6. That is, in the case of the QPSK modulation, 2 bits per symbol may be transmitted, in the case of the 16 QAM modulation, 4 bits per symbol may be transmitted, and in the case of the 64 QAM modulation, 6 bits per symbol may be transmitted. Further, the modulation scheme above 256 QAM may be used depending on the system modification.

Figure 2:
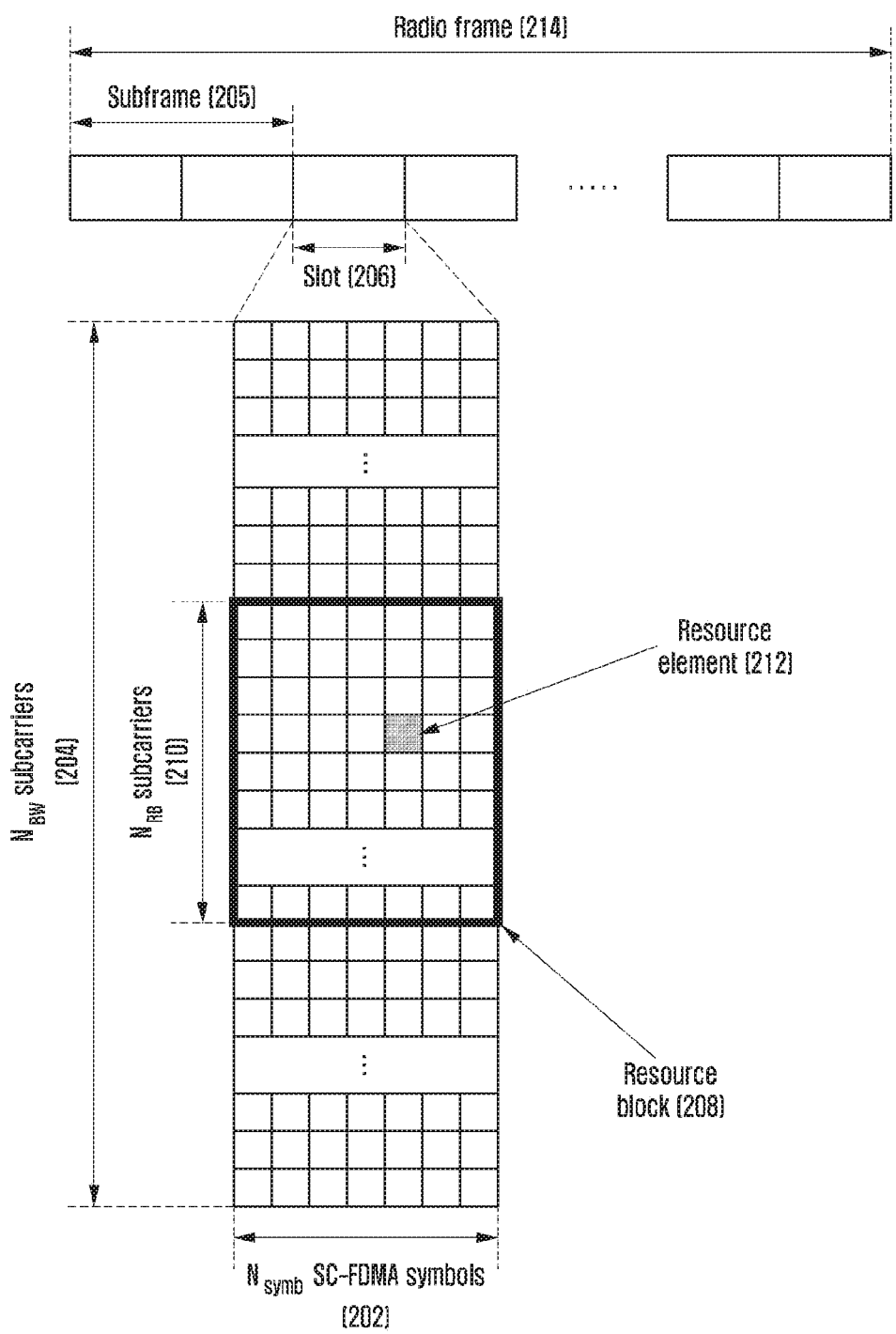
FIG. 2 is a diagram illustrating a structure of an uplink resource region in the LTE system according to an embodiment of the disclosure.

FIG. 2 is a diagram illustrating a basic structure of a time-frequency domain that is a radio resource region in which data or a control channel is transmitted in the uplink, the LTE system according to an embodiment of the disclosure.

Referring to FIG. 2, an abscissa represents a time domain and an ordinate represents a frequency domain. The minimum transmission unit in the time domain is an SC-FDMA symbol 202, and the $N_{symb}$ SC-FDMA symbols are gathered to form one slot 206. Two slots are gathered to form one subframe 205. Further, a radio frame 214 is a time domain interval consisting a plurality of subframes. The minimum transmission unit in the frequency domain is a subcarrier, in which the entire system transmission bandwidth includes a total of $N_{BW}$ subcarriers 204. The $N_{BW}$ may have a value proportional to the system transmission bandwidth.

A basic unit of resources in the time-frequency domain is a resource element (RE) 212 and may be defined by an SC-FDMA symbol index and a subcarrier index. The resource block pair (RBs) 208 is defined as $N_{symb}$ continued SC-FDMA symbols in the time domain and $N_{RB}$ continued subcarriers 210 in the frequency domain. Accordingly, one RB consists of $N_{symb} \times N_{RB}$ REs. In general, the minimum transmission unit of the data or the control information is the RB unit. The PUCCH is mapped to a frequency domain corresponding to 1 RB and transmitted for one subframe.

In the LTE system, a timing relationship between a PUCCH or a PUSCH is defined, with the PUCCH or the PUSCH being an uplink physical channel to which an HARQ ACK/NACK corresponding to a PDSCH as a physical channel for downlink data transmission or a PDCCH or EPDDCH including a semi-persistent scheduling release (SPS release) is transmitted. For example, in an LTE system operated by frequency division duplex (FDD), the HARQ ACK/NACK corresponding to the PDSCH transmitted in an n-4-th subframe or the PDCCH/EPDCCH including the SPS release may be transmitted to the PUCCH or the PUSCH in an n-th subframe.

In the LTE system, the downlink HARQ has adopted an asynchronous HARQ scheme in which data retransmission time is not fixed. That is, if for initial transmission data transmitted by the base station, the HARQ NACK is fed back from the terminal, the base station freely determines transmission time of retransmission data based on the scheduling operation. The terminal performs buffering on data determined as an error as a result of decoding the received data for an HARQ operation and then performs combining with the next transmitted retransmission data.

The HARQ ACK/NACK information of the PDSCH transmitted in subframe n-k is transmitted from the terminal to the base station on the PUCCH or the PUSCH in the subframe n. At this time, the k may be defined differently according to the FDD or time division duplex (TDD) of the LTE system and the subframe configuration thereof. For example, in the case of the FDD LTE system, the k is fixed as 4. Meanwhile, in the case of the TDD LTE system, the k may be changed depending on the subframe configuration and the subframe number. In addition, the value of k may be differently applied depending on the TDD configuration of each carrier at the time of data transmission through a plurality of carriers. In the case of the TDD, the k value is determined according to the TDD UL/DL configuration as shown in Table 2 below.

TABLE 2

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In the LTE system, unlike the downlink HARQ, the uplink HARQ has adopted a synchronous HARQ scheme in which the data transmission time is fixed. That is, an uplink/downlink timing relationship of the PUSCH that is the physical channel for uplink data transmission, the PDCCH that is the downlink control channel preceding the PUSCH, and a physical hybrid indicator channel (PHICH) that is a physical channel to which the downlink HARQ ACK/NACK corresponding to the PUSCH is transmitted may be depending on the following rules.

If in the subframe n, the terminal receives the PDCCH including the uplink scheduling control information transmitted from the base station or the PHICH to which the downlink HARQ ACK/NACK are transmitted, the terminal transmits the uplink data corresponding to the control information on the PUSCH in subframe n+k. At this time, the k is differently defined depending on the FDD or TDD of the LTE system and the configuration thereof. For example, in the case of the FDD LTE system, the k is fixed as 4. Meanwhile, in the case of the TDD LTE system, the k may be changed depending on the subframe configuration and the subframe number. In addition, the value of k may be differently applied depending on the TDD configuration of each carrier at the time of data transmission through a plurality of carriers. In the case of the TDD, the k value is determined according to the TDD UL/DL configuration as shown in Table 3 below.

TABLE 3

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | | 6 | | 4 | | | 6 | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | | 7 | 7 | | | 7 | 7 | | | 5 |

Meanwhile, the HARQ-ACK information of the PHICH transmitted in subframe i is related to the PUSCH transmitted in subframe i-k. In the case of the FDD system, the k is given as 4. That is, in the FDD system, the HARQ-ACK information of the PHICH transmitted in the subframe i is related to the PUSCH transmitted in the subframe i-k. In the terminal in which enhanced interference management and traffic adaptation (EIMTA) is not configured in the case of the TDD system, when only one serving cell is configured or all of the same TDD UL/DL configurations are applied to a plurality of serving cells, a k value may be given according to the following Table 4 at the time of applying 6 in the TDD UL/DL configuration 1.

TABLE 4

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 7 | 4 | | | 7 | 4 | | | |
| 1 | | | 4 | | 6 | | 4 | | | 6 |
| 2 | | | | 6 | | | | | 6 | |
| 3 | 6 | | | | | | | 6 | 6 | |
| 4 | | | | | | | | 6 | 6 | |
| 5 | | | | | | | | 6 | | |
| 6 | | 6 | 4 | | | 7 | 4 | | | 6 |

That is, for example, in the TDD UL/DL configuration 1, the PHICH transmitted in the subframe 6 may be the HARQ-ACK information of the PUSCH transmitted in subframe 2 before subframe 4.

When the TDD UL/DL configuration is 0, if the HARQ-ACK is received as the PHICH resource corresponding to $I_{PHICH}=0$, the PUSCH that the HARQ-ACK information indicates is transmitted in the subframe i-k, wherein the k value is given according to the above Table 4. If the HARQ-ACK is received as the PHICH resource corresponding to $I_{PHICH}=1$ when the TDD UL/DL configuration is 0, the PUSCH that the HARQ-ACK information indicates is transmitted in subframe i-6.

In the case of the LTE system (licensed-assisted access system (LAA)) that performs the downlink or uplink communications in an unlicensed band, the base station or the terminal should determine an idle state of the unlicensed band performing the communications prior to transmitting the downlink or uplink signal. For example, only when the magnitude of the signal received in the unlicensed band for a predetermined time is smaller than a specific threshold, the base station or the terminal may perform the signal transmission in the unlicensed band. Therefore, in the case of transmitting the uplink signal in the LAA system, the base station determines the idle state of the unlicensed band, and if it is determined that the unlicensed band is in the idle state, the base station may transmit the PDCCH including the uplink scheduling control information for configuring the uplink data transmission of the terminal.

The description of the wireless communication system is based on the LTE system, and the contents of the disclosure are not limited to the LTE system but may be applied to various wireless communication systems such as NR and 5G. Also, in the embodiment, in a case where the disclosure is applied to another wireless communication system, the k value may be changed and applied to a system using a modulation scheme corresponding to FDD.

Figure 3:
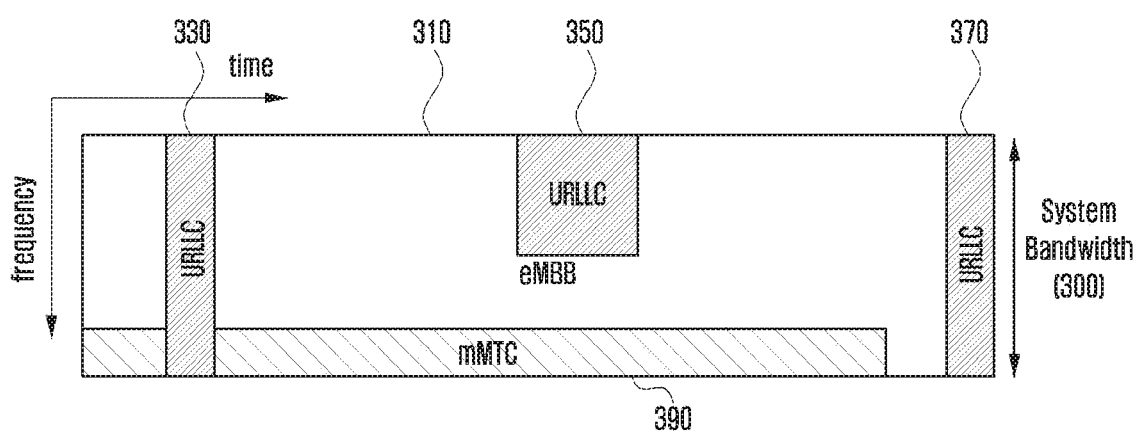
FIGS. 3 and 4 are diagrams illustrating an example in which data for eMBB, URLLC, and mMTC, which are services to be considered in a 5G system are allocated in frequency-time resources according to various embodiments of the disclosure.
Figure 4:
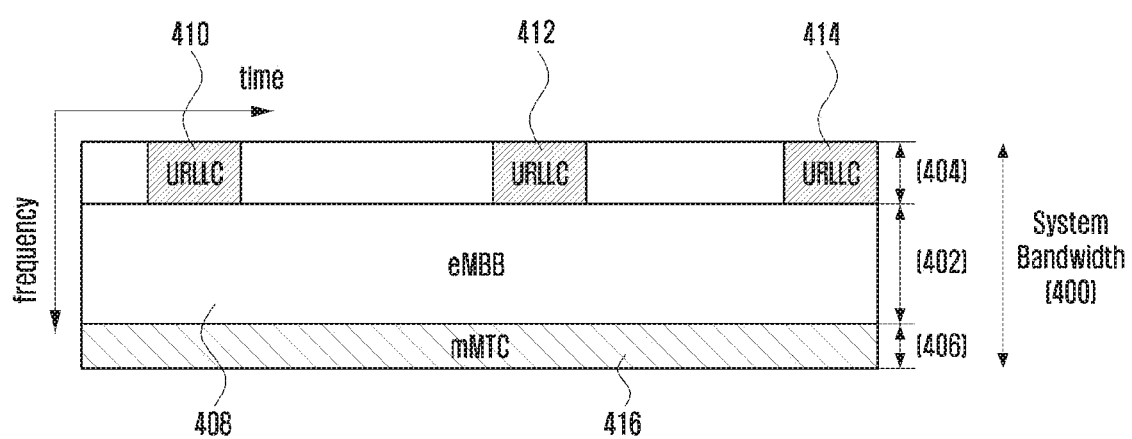

FIGS. 3 and 4 are diagrams illustrating an example in which data for eMBB, URLLC, and mMTC, which are services to be considered in a 5G or NR system are allocated in frequency-time resources according to various embodiments of the disclosure.

Referring to FIGS. 3 and 4, a method for allocating frequency and time resources for information transmission in each system can be seen.

First, FIG. 3 shows an appearance in which the data for the eMBB, the URLLC, and the mMTC are allocated in the entire system frequency bandwidth 300. If URLLC data 330, 350, and 370 need to be generated and transmitted while the eMBB 310 and the mMTC 390 are allocated and transmitted in a specific frequency band, the transmitter may empty or does not transmit a part to which the eMBB 310 and the mMTC 390 are allocated in advance is emptied and may transmit the URLLC data 330, 350, and 370. In the URLLC among the above services, since there is a need to reduce the delay time, the URLLC data 330, 350, and 370 may be transmitted while being allocated to a part of the resource 310 to which the eMBB is allocated. Of course, if the URLLC is transmitted by being additionally allocated to the resource to which the eMBB is allocated, the eMBB data may not be transmitted in the redundancy frequency-time resources, such that the transmission performance of the eMBB data may deteriorate. That is, in such a case, the eMBB data transmission failure may occur due to the URLLC allocation.

Referring to FIG. 4, the entire system frequency band 400 may be divided into each subband 402, 404, and 406 and may be used for the purpose of transmitting service and data. The information related to the subband configuration is determined in advance, and thus may be transmitted from the base station to the terminal through higher signaling. Alternatively, the information related to the subbands may be arbitrarily divided by the base station or a network node to transmit services without transmitting separate subband configuration information to the terminal. FIG. 4 illustrates an example in which the subband 402 is used for eMBB 408 data transmission, the subband 404 is used for URLLC 410, 412, and 414 data transmission, and the subband 406 is used for mMTC 416 data transmission.

According to the embodiment of the disclosure, a TTI length used for the URLLC transmission may be shorter than that used for the eMBB or mMTC transmission. In addition, a response to the information related to the URLLC may be transmitted faster than the eMBB or mMTC, such that the URLLC may transmit and receive the information with the low latency.

Figure 5:
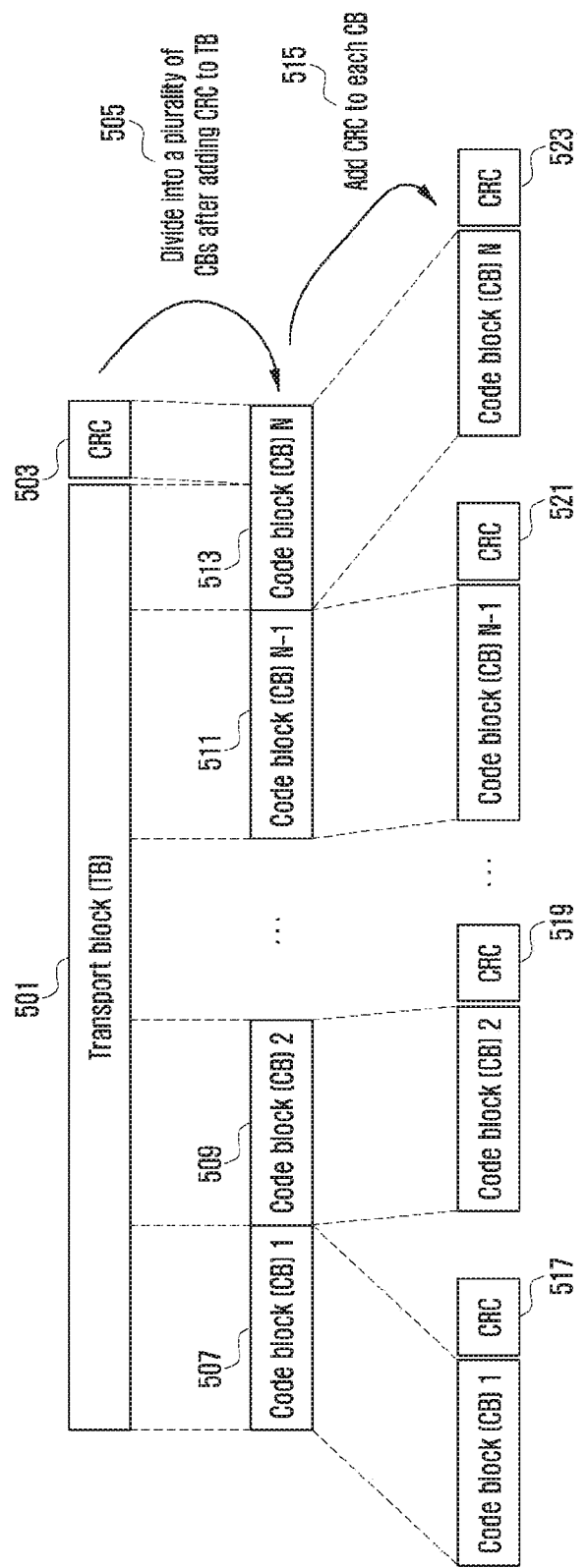
FIG. 5 is a diagram illustrating a process in which one transport block is divided into several code blocks and a CRC is added according to an embodiment of the disclosure.

FIG. 5 is a diagram illustrating a process in which one transport block is divided into several code blocks and a CRC is added according to an embodiment of the disclosure.

Referring to FIG. 5, a CRC 503 may be added to the last or first part of one transport block 501 to be transmitted in the uplink or the downlink. The CRC may have 16 bits or 24 bits, the predetermined number of bits, or the number of bits varying depending on a channel condition or the like, and the CRC may be used to determine whether channel coding succeeds.

The blocks 501 and 503 to which the TB and the CRC are added may be divided into several codeblocks (CBs) 507, 509, 511, and 513 (505). The maximum size of the code block is set in advance and the code block may be divided accordingly. In this case, the last code block 513 may be smaller than other code blocks, or the last code block 513 may be added with 0, a random value, or 1 so that the length thereof may be adjusted to be equal to the length of other code blocks. CRCs 517, 519, 521, and 523 may be added to the divided code blocks, respectively (515). The CRC may have 16 bits or 24 bits or the predetermined number of bits, and may be used to determine whether channel coding succeeds.

However, the CRC 503 added to the TB and the CRCs 517, 519, 521, and 523 added to the code block may be omitted depending on a type of channel codes to be applied to the code block. For example, if a low-density parity-check (LDPC) code not a turbo code is applied to a code block, the CRCs 517, 519, 521 and 523 to be inserted into each code block may be omitted. However, even when the LDPC is applied, the CRCs 517, 519, 521, and 523 may be added to the code block as they are. In addition, the CRC may be added or omitted even when a polar code is used.

As will be described below, the eMBB service is referred to as a first type service, and the data for eMBB is referred to as first type data. The first type service or the first type data is not limited to the eMBB, but may correspond to even a case in which a high speed data transmission is required or a broadband transmission is performed. Further, the URLLC service is referred to as a second type service, and the data for URLLC is referred to as second type data. The second type service or the second type data are not limited to the URLLC, but may correspond to even another system in which the low latency is required or the high reliability transmission is required or a case in which the low latency and the reliability are required simultaneously. Further, the mMTC service is referred to as a third type service and the data for mMTC is referred to as third type data. The third type service or the third type data are not limited to the mMTC but may correspond to a case in which low speed, wide coverage, low power or the like are required. In addition, it may also be understood that the first type service may or may not include the third type service when describing the embodiment.

To transmit the above three services or data, a structure of physical layer channels used for each type may be different. For example, at least one of the TTI length, the frequency resource allocation unit, the control channel structure, and the method for mapping data may be different.

Although three services and three data have been described above, more types of services and the corresponding data may exist. Even in this case, the content of the disclosure may be applied.

For describing the method and the apparatus proposed in the above various embodiments of the disclosure, the terms physical channel and signal in the existing LTE or LTE-A system can be used. However, the content of the disclosure may be applied to wireless communication systems other than the LTE and LTE-A systems.

In the following embodiment of the disclosure, at least one of the PHICH, an uplink scheduling grant signal, and a downlink data signal is referred to as a first signal. In addition, in the disclosure, at least one of the uplink data signal for uplink scheduling grant and the HARQ ACK/NACK for the downlink data signal are referred to as a second signal. That is, in the embodiment of the disclosure, among the signals transmitted from the base station to the terminal, a signal expecting a response from terminal may be the first signal, and a response signal of the terminal corresponding to the first signal may be the second signal. Also, in the embodiment of the disclosure, the service type of the first signal may be at least one of eMBB, URLLC, and mMTC, and the second signal may also correspond to at least one of the services. For example, in the LTE and LTE-A systems, the DCI formats 0, 0A, and 0B or 4, 4A, and 4B and PHICH may be the first signal, and the second signal corresponding thereto may be the PUSCH. In addition, for example, in the LTE and LTE-A systems, the PDSCH may be the first signal, and the PUCCH or PUSCH including the HARQ ACK/NACK information of the PDSCH may be the second signal. Also, the PDCCH or the EPDCCH including an aperiodic CSI trigger may be the first signal, and the second signal corresponding thereto may be the PUSCH including channel measurement information.

In the following embodiment of the disclosure, if it is assumed that the base station transmits the first signal in an n-th TTI and the terminal transmits the second signal in an n+k-th TTI, notifying the transmission timing of the second signal to the terminal by the base station is the same as notifying a K value. At this time, k may be set through one or more components. For example, k may be set as k=b+a through b and a. In this case, the value b may be previously defined depending on processing capability of the terminal or capability of the terminal, a frame structure type (frame structure type 1 means FDD, frame structure type 2 means TDD, and frame structure type 3 means LAA) or the like or may be set via the upper signal from the base station.

For example, in the FDD LTE system, the terminal in the normal mode may preset the value b to be 4, and the terminal in the latency reduction mode may preset the value b to be a value smaller than the b value of the terminal in the normal mode, for example, b=3, or receive the setting of the value b from the base station. It is assumed that the terminal transmits the second signal in an n+b+a-th TTI when the base station transmits the first signal in an n-th TTI, and if the value b is preset, notifying the transmission timing of the second signal from the base station to the terminal is the same as informing an offset value a. The normal mode and the latency reduction mode are described below in more detail.

The contents of the disclosure are described based on the FDD LTE system, but can also be applied to the TDD system, the LAA system, the NR system and the like.

Hereinafter, in the disclosure, the higher signaling is a method for transmitting a signal from a base station to a terminal using a downlink data channel of a physical layer or from a terminal to a base station using an uplink data channel of a physical layer, and may also be referred to as RRC signaling, PDCP signaling, or a MAC control element (MAC CE).

The disclosure describes a method for determining transmission timing of a second signal after a terminal or a base station receives a first signal, but the method for transmitting a second signal may be various. For example, after the terminal receives the PDSCH which is downlink data, the transmission timing of the HARQ ACK/NACK information corresponding to the PDSCH to the base station follows the method described in the disclosure. However, a method for selecting a PUCCH format to be used, a method for selecting a PUCCH resource, a method for mapping HARQ ACK/NACK information to a PUSCH or the like may follow the conventional LTE system.

In the disclosure, the normal mode is a mode using the transmission timing of the first signal and the second signal used in the conventional LTE and LTE-A systems. In the normal mode, it is possible to secure a signal processing time of about 3 ms, including the TA in the normal mode. For example, in the FDD LTE system operated in the normal mode, the second signal is transmitted by the terminal in the subframe n+4 with respect to the first signal received by the terminal in the subframe n. In the disclosure, the transmission can be referred to as transmission timing n+4. If the second signal is scheduled to be transmitted at the timing n+4 with respect to the first signal transmitted in the subframe n+k, the second signal may be transmitted in subframe n+k+4.

On the other hand, the timing n+4 in the TDD means following the previously promised timing relationship under the assumption that the subframe in which the second signal with respect to the first signal transmitted in the subframe n may be transmitted fastest is n+4. In the TDD system, since the subframe n+4 may not be for uplink transmission, it may be impossible for the terminal to transmit the second signal in the subframe n+4. Therefore, it is necessary to define the timing relationship for the second signal transmission, and when the above relationship is defined, the minimum timing is defined as the subframe n+4 and one following the definition may be defined as the timing n+4.

On the other hand, timing n+3 in the TDD means following the previously promised timing relationship under the assumption that the subframe in which the second signal may be transmitted fastest for the first signal transmitted in the subframe n is n+3. Similar to the timing n+4, it is necessary to define the timing relationship for the second signal transmission, and when the above relationship is defined, the minimum timing is defined as subframe n+3 and one following the definition may be defined as the timing n+3. Hereinafter, in the disclosure, the transmission timing n+4 is assumed to be the transmission timing of the normal mode operation. However, the transmission timing n+4 is only one example, and even in the case of other transmission timings such as n+3, n+2, and n+1, the method proposed in the disclosure may be applied.

Meanwhile, the latency reduction mode or the processing time reduction mode is a mode which can make the transmission timing of the second signal with respect to the first signal be equal to or faster than the normal mode, and can reduce the latency time. In the latency reduction mode, it is possible to control timing by various methods. In the disclosure, the latency reduction mode may be interchangeably used with the reduced processing time mode.

The latency reduction mode may be configured in the terminal which supports the latency reduction mode by the higher signaling. The terminal in which the delay reduction mode is configured may transmit the second signal before the subframe n+4 with respect to the first signal transmitted in the subframe n. For example, the terminal in which the delay reduction mode is configured may transmit the second signal in the subframe n+4 with respect to the first signal transmitted in the subframe n. In the disclosure, the transmission may be referred to as transmission timing n+3. Hereinafter, in the disclosure, the transmission timing n+3 is assumed to be the transmission timing of the latency reduction mode operation. However, the transmission timing n+3 is only one example, and even in the case of the transmission timing smaller than the transmission timings of the normal mode operation such as n+2 and n+1, the method proposed in the disclosure may be applied.

An example of the timing n+3 is as follows. If the second signal is scheduled to be transmitted at the timing n+3 with respect to the first signal transmitted in subframe n+1, the second signal may be transmitted in the subframe n+4. In addition, for example, if the second signal is scheduled to be transmitted at the timing n+3 with respect to the first signal transmitted in subframe n+2, the second signal may be transmitted in subframe n+5. That is, if the second signal is scheduled to be transmitted at the timing n+3 with respect to the first signal transmitted in the subframe n+k, the second signal may be transmitted in subframe n+k+3.

The disclosure will be described based on the case in which the lengths of the TTIs used in the normal mode and the latency reduction mode are the same. However, the contents of the disclosure can be applied even to the case in which the length of the TTI in the normal mode and the length of the TTI in the latency reduction mode are different.

In the disclosure, the transmission mode in which the fastest transmission timing of the second signal with respect to the first signal transmitted in the subframe n is the subframe n+4 may be referred to as the normal mode, and the transmission mode in which the fastest transmission timing of the second signal with respect to the first signal transmitted in the subframe n is the subframe n+2 or n+3 may be referred to as the latency reduction mode or the signal processing time reduction mode. In the above description, the subframe n+4 which is the reference transmission timing at which the normal mode and the latency reduction mode are divided is changed to another timing, so that the disclosure can be applied.

If the latency reduction mode is configured in the terminal by the higher signaling, there is an uncertainty as to when the higher signaling is delivered to the terminal. Therefore, a need may exist for a method for always transmitting a second signal at a predetermined timing regardless of a configuration of a base station. For example, even if the base station configures the latency reduction mode to perform the transmission timing n+3 in the terminal, it cannot secure that the terminal exactly knows when the configuration of the latency reduction mode is valid. Therefore, a need may exist for a method for performing the transmission timing n+4 while the configuration is made. That is, a need may exist for a method for performing the transmission timing n+4 regardless of the configuration of the latency reduction mode.

In the disclosure, a method for performing a transmission according to the transmission timing n+4 regardless of the configuration of the latency reduction mode may be interchangeably used with a fall-back mode transmission. Therefore, when the base station performs the uplink reception operation by considering that the second signal is transmitted at the timing n+4 not at the timing n+3 or timing n+2 if the fall-back mode transmission is made.

The fall-back mode transmission may be performed when the DCI for the first signal transmission is transmitted in a specific search space.

A cell-specific search space (CSS) and a UE-specific search space (USS), which may be a search space may be defined as follows. A control channel element (CCE) number to which a downlink control signal of an aggregation level L and a control channel in subframe k can be mapped may be calculated as follows.

$$L\{(Y_k+m')\bmod \lfloor N_{CCE,k}/L \rfloor\}+i$$

In aggregation levels 4 and 8 in the CSS, $Y_k$ is defined as 0. In the USS, $Y_k=(A \cdot Y_{k-1}) \bmod D$, $Y_{-1}=n_{RNTI}$ is not 0, A=39827, D=65537, and $k=\lfloor n_s/2 \rfloor$, and $n_s$ is a slot number in a radio frame. In the above description, x mod y may indicate the remainder obtained by dividing x by y. $M^{(L)}$ means the number of downlink control channels of the aggregation level L. m may be a natural number from 0 to $M^{(L)}$, m'=m in CSS, m'=m+$M^{(L)}$ $n_{cl}$ in the USS, and $n_{cl}$ may be a carrier indicator field value. The value of $M^{(L)}$ may be defined as shown in the following Table 5.

TABLE 5

| | Search space $S_k^{(L)}$ | | |
|---|---|---|---|
| Type | Aggregation level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

For example, the CSS determines the CCE number at which the control signal begins to be mapped as 0, 4, 8, and 12 at aggregation level 4, and 0 and 8 at aggregation level 8. The USS may be changed depending on an RNTI value serving as a unique number of the terminal.

If the DCI for the first signal transmission is transmitted in a specific search space, then the fall-back mode transmission is used as follows by way of example. When the DCI is transmitted in the region set as the common search space, with respect to the first signal related to the DCI, the second signal may be always transmitted at the timing n+4 regardless of the configuration of the latency mode reduction of the base station. That is, in the above method, even if the terminal is configured to transmit the second signal at the timing n+3, if the DCI is transmitted in the cell common search space, the terminal transmits the second signal at the timing n+4. Conversely, if the DCI is transmitted in the UE-specific search space, the terminal transmits the second signal at the timing n+3 as configured.

Describing in more detail, the base station may perform the configuration of the latency reduction mode in the terminal by the higher signaling. If the first signal is received from the base station, the terminal confirms whether the received first signal transmission is the fall-back mode scheduling. If it is determined that the first signal transmission is the fall-back mode, the terminal transmits the second signal at the normal mode transmission timing, for example, the timing n+4 regardless of whether the latency reduction mode is configured. If it is determined that the first signal transmission is not the fall-back mode transmission, the terminal transmits the second signal at the transmission timing of the latency reduction mode, for example, the timing n+3 or the timing n+2.

If the DCI for the first signal transmission as described above uses a specific transmission timing when transmitted in the specific search space such as the cell common search space or the DCI for the first signal transmission uses the fall-back mode transmission when transmitted in a specific search space such as the cell common search space, if the cell common search space is not set in the specific cell (e.g., secondary scell (Scell) of the LTE system), the fall-back transmission in the specific cell or the transmission timing in the specific cell may not be defined. Accordingly, the disclosure proposes a method for using a fall-back mode transmission in the cell in which the cell common search space is not set or the cell common search space is not be set as described above.

In the disclosure, the first search space may be interchangeably mixed with a cell-specific search space, and the second search space may be interchangeably mixed with a UE-specific search space. In addition, in the disclosure, the detection and decoding may be used interchangeably.

The fall-back mode in the disclosure is used when the base station configures the latency reduction mode in the terminal, and the fall-back mode is not used in the normal mode. In addition, in the disclosure, the second signal corresponding to the downlink control signal may be the HARQ-ACK for the downlink data transmission scheduled for the control signal or the uplink data for uplink data transmission scheduling of the control signal.

In the case of the LTE system that performs the downlink or uplink communication in an unlicensed band, generally, the cell performing the downlink and uplink communication in a licensed band is configured as a primary cell (PCell), and a downlink or uplink and the LAA cell performing the downlink or uplink communication in the unlicensed band is configured as the secondary cell (hereinafter, SCell or LAA SCell). That is, the terminal transmits and receives the control information necessary for maintaining and managing the connection with the base station such as the RRC information, the SIB, and the paging information through the PCell operated in the licensed band. In addition, in the case of a terminal requiring a high data rate, the SCell may be additionally configured and used for data transmission.

Therefore, in the case of the current LTE system, the terminal does not detect or decode the DCI in the cell-specific search space when the terminal determines that the cell-specific search space does not exist in the cell configured as the SCell or even if the terminal determines that the cell-specific search space exists. Therefore, cells having no cell specific search space such as the LAA SCell may not use the fall-back mode transmission or different transmission timings through the cell specific search space as described above.

In the LAA system, a field 'timing offset' indicating TUSCH transmission timing' is included in the DCI transmitted to configure the PUSCH transmission of the terminal, and the base station may set the PUSCH transmission timing of the terminal based on the value k of the field. For example, the terminal receiving the DCI or the UL grant for configuring the PUSCH transmission in the subframe n may transmit the uplink data on the PUSCH configured in the received DCI in the subframe n+4+k based on the value (k) indicated by the 'timing offset" included in the DCI. In this case, the n+4 is the transmission timing of the normal transmission mode in the FDD system. The range of the value of k may vary depending on the size of the field indicating the timing offset value. For example, if the timing offset field has a 4-bit size, the k may have a value ranging from 0 to 15 as shown in the following Table 6.

TABLE 6

| Value of 'Timing offset' field | k |
|---|---|
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | 10 |
| 1011 | 11 |
| 1100 | 12 |
| 1101 | 13 |
| 1110 | 14 |
| 1111 | 15 |

Therefore, if it is operated in the latency reduction mode in the LAA system as described above, the terminal receiving the DCI or the UL grant for configuring the PUSCH transmission in the subframe n may transmit the uplink data on the PUSCH configured in the received DCI in the subframe n+3+k based on the value (k) indicated by the 'timing offset" included in the DCI. In this case, the n+3 is the transmission timing of the latency reduction mode in the FDD system.

If the latency reduction mode is configured in the terminal by the higher signaling, there is uncertainty about when the higher signaling is transmitted to the terminal, when the terminal has applied the information transmitted through the signaling or the like. Therefore, a need may exist for a method for always transmitting a second signal at a predetermined timing regardless of the configuration of the base station. For example, even if the base station configures the latency reduction mode in the terminal, it cannot secure that the terminal exactly knows when the configuration of the latency reduction mode is valid. Therefore, a need may exist for a method for a base station to allow a terminal to use a normal mode transmission timing, for example, the transmission timing n+4 while the delay reduction mode is configured. That is, a need may exist for a method for performing a transmission at normal mode transmission timing regardless of the configuration of the latency reduction mode.

At this time, if there is no cell specific search space like the LAA SCell, it is possible to perform the transmission at the normal mode transmission timing regardless of the configuration of the latency reduction mode by using at least one value of the timing offset fields transmitted from the LAA SCell. For example, the difference value between the normal mode transmission timing and the latency reduction mode transmission timing may be set by at least one value of the timing offset fields. For example, when the normal mode transmission timing and the latency reduction mode transmission timing each are n+4 and n+3, at least one value of the timing offset fields may be a value of −1 which is the difference value between the normal mode transmission timing and the latency reduction mode transmission timing, so that transmission can be made at the normal mode transmission timing regardless of the configuration of the latency reduction mode.

When the terminal configured in the normal mode in the LAA SCell receives the UL grant in the subframe n, the PUSCH transmission timing of the terminal is set from n+4 to n+19 depending on the value of the timing offset field defined in the above Table 6. When the terminal configured in the normal mode in the LAA SCell receives the UL grant in the subframe n, the PUSCH transmission timing of the terminal is set from n+3 to n+18 depending on the value of the timing offset field defined in the above Table 6. At this time, it is assumed that the normal mode transmission timing and the latency reduction mode transmission timing each are n+4 and n+3.

In other words, the terminal configured in the latency reduction mode in the LAA SCell may use the normal mode transmission timing (e.g., n+4) as the latency reduction mode transmission timing (regardless of the normal mode transmission timing and its setting). However, the transmission from n+3 to n+18, which is the PUSCH transmission timing, may be configured when the terminal is configured in the delay reduction mode by applying a new timing offset as shown in the following Table 7 in which at least one of the values of the timing offset field is changed. In this case, the value of the new timing offset field of the following Table 7, for example, −1, which is a value of field 1111, may be set to be a value of timing offset field 0000 or a value of another specific field, but the value of −1 may be added to the last field of the timing offset field as shown in the following Table 7. Accordingly, the difference between the PUSCH transmission timings in the normal mode and the latency reduction mode may be minimized. In addition, as in 15 which is the timing offset value, a field requiring the longest time up to the transmission of the actual PUSCH is replaced with −1, thereby achieving the latency reduction effect.

TABLE 7

| Value of 'Timing offset' field | k |
|---|---|
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | 10 |
| 1011 | 11 |
| 1100 | 12 |
| 1101 | 13 |
| 1110 | 14 |
| 1111 | −1 |

Figure 6:
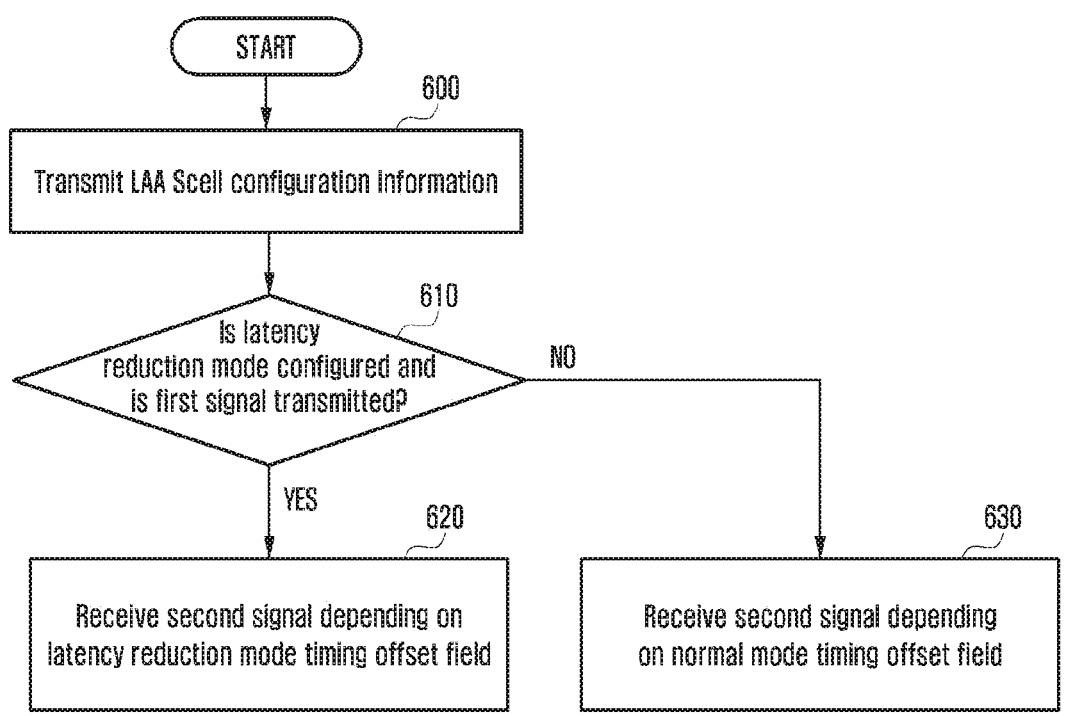
FIG. 6 is a flow chart of an operation method of a base station according to an embodiment of the disclosure.

FIG. 6 is a flow chart of an operation method of a base station according to an embodiment of the disclosure.

Referring to FIG. 6, the base station configures the terminal to add the LAA SCell, and configures the configuration information required to perform the downlink or uplink communication in the SCell at operation 600. If the communication with the terminal is performed through the latency reduction mode, the base station configures the latency reduction mode in the terminal, generates the downlink control signal for transmitting the first signal (or UL grant), which configures the uplink data transmission of the terminal, and transmits the first signal in the subframe n at operation 610. At this time, the base station identifies the normal mode transmission timing, for example, n+4 and a k value of the timing offset field defined for the latency reduction mode as in the following Table 7, and uses the determined k value to receive the PUSCH or the second signal that the terminal transmits at the subframe n+4+k at operation 620.

If the communication with the terminal is performed through the normal mode, the base station generates the downlink control signal for transmitting the first signal (or UL grant), which configures the uplink data transmission of the terminal, to the terminal, and transmits the first signal in the subframe n at operation 610. At this time, the base station uses the normal mode transmission timing, for example, n+4 and the timing offset field used at the time of the normal mode transmission as in the above Table 6, and uses the determined k value to receive the PUSCH or the second signal that the terminal transmits at the subframe n+4+k at operation 630.

The operation of the base station can be modified and performed as follows. The base station configures the terminal to add the LAA SCell, and configures the configuration information required to perform the downlink or uplink communication in the SCell at operation 600. If the communication with the terminal is performed through the latency reduction mode, the base station configures the latency reduction mode in the terminal, generates the downlink control signal for transmitting the first signal (or UL grant), which configures the uplink data transmission of the terminal, and transmits the first signal in the subframe n at operation 610. At this time, the base station receives the PUSCH or the second signal that the terminal transmits in subframe n+3+k' at operation 620, and k', which is the values of the timing offset field defined for the latency reduction mode applied at that time may be defined as shown in the following Table 8.

TABLE 8

| Value of 'Timing offset' field | k' |
|---|---|
| 0000 | 1 |
| 0001 | 2 |
| 0010 | 3 |
| 0011 | 4 |
| 0100 | 5 |
| 0101 | 6 |
| 0110 | 7 |
| 0111 | 8 |
| 1000 | 9 |
| 1001 | 10 |
| 1010 | 11 |
| 1011 | 12 |
| 1100 | 13 |
| 1101 | 14 |
| 1110 | 15 |
| 1111 | 0 |

Alternatively, the k' value in the configuration of the latency reduction mode may be defined as k'=k+1, and the k value in the configuration of the latency reduction mode may be defined as shown in the above Table 7.

The operation of the base station can be modified and performed as follows. The base station configures the terminal to add the LAA SCell, and configures the configuration information required to perform the downlink or uplink communication in the SCell at operation 600. If the communication with the terminal is performed through the latency reduction mode, the base station configures the latency reduction mode in the terminal, generates the downlink control signal for transmitting the first signal (or UL grant), which configures the uplink data transmission of the terminal, and transmits the first signal in the subframe n at operation 610. At this time, the base station receives the PUSCH or the second signal that the terminal transmits in subframe n+3+k" at operation 620. At this time, a k" value, which is the value of the timing offset field defined for the latency reduction mode may be defined as k"=mod (k+1, 16), and the k value in the configuration of the latency reduction mode may be defined as shown in the above Table 6. In the above, mod (A, B) means the remainder obtained by dividing A by B. For example, mod (1,16) is 1 and mod (16,16) is 0.

Figure 7:
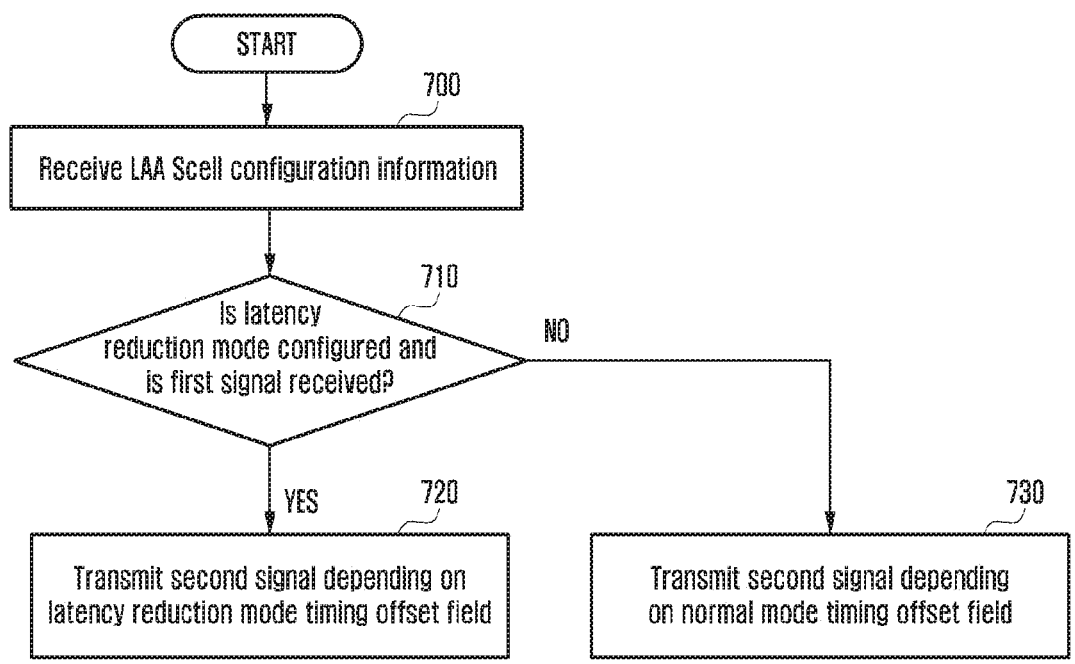
FIG. 7 is a flow chart of an operation method of a terminal according to an embodiment of the disclosure.

FIG. 7 is a flow chart of an operation method of a terminal according to an embodiment of the disclosure.

Referring to FIG. 7, the terminal is configured to add the LAA SCell from the base station and receives the configuration information for performing the downlink or uplink communication in the LAA SCell at operation 700. If the terminal configured to perform the communication from the base station through the latency reduction mode receives the uplink data transmission scheduling information, the first signal, or the UL grant from the base station at operation 710, the terminal transmits the PUSCH or the second signal in the subframe n+4+k by using the normal mode transmission timing, for example, n+4 and the timing offset field defined for the latency reduction mode as in the above Table 7 at operation 720. If the terminal configured to perform the communication from the base station through the normal mode receives the uplink data transmission scheduling information, the first signal, or the UL grant from the base station at operation 730, the terminal transmits the PUSCH or the second signal in the subframe n+4+k by using the normal mode transmission timing, for example, n+4 and the timing offset field defined for the normal mode as in the above Table 6 at operation 730.

The operation of the terminal can be modified and performed as follows. The terminal is configured to add the LAA SCell from the base station and receives the configuration information for performing the downlink or uplink communication in the LAA SCell at operation 700. If the terminal configured to perform the communication from the base station through the latency reduction mode receives the uplink data transmission scheduling information, the first signal, or the UL grant from the base station at operation 710, the terminal transmits the PUSCH or the second signal in subframe n+3+k' at operation 720. At this time, the k', which is the timing offset field value defined for the latency reduction mode, may be defined as shown in the above Table 8. Otherwise, k' may be defined like k'=k+1 and the k value in the configuration of the latency reduction mode may be defined as shown in the above Table 7.

In the disclosure, the operation of the latency reduction mode has been described to use the timing n+3. However, this is only a specific example for the purpose of assisting the description of the disclosure, and is not intended to limit the scope of the disclosure. That is, the latency reduction mode of the disclosure may also be applied to the configuration which transmits the second signal at the timing n+2. For example, when the latency reduction mode is configured to use the timing n+2, the base station and the terminal may use the following Table 9 instead of the above Table 7 to determine the k value at n+4+k which is the transmission timing of the second signal.

TABLE 9

| Value of 'Timing offset' field | k |
|---|---|
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | 10 |
| 1011 | 11 |
| 1100 | 12 |
| 1101 | 13 |
| 1110 | −2 |
| 1111 | −1 |

Figure 8:
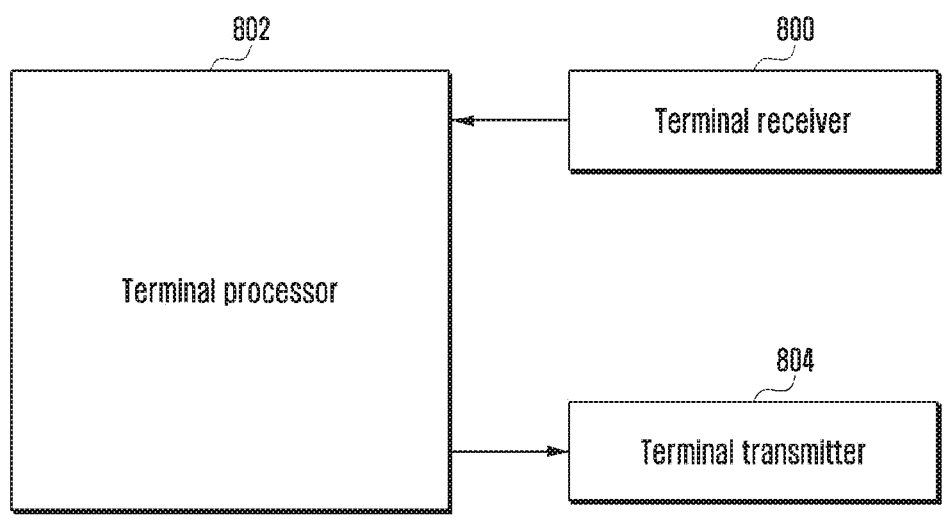
FIG. 8 is a block diagram illustrating an internal structure of the terminal according to an embodiment of the disclosure.
Figure 9:
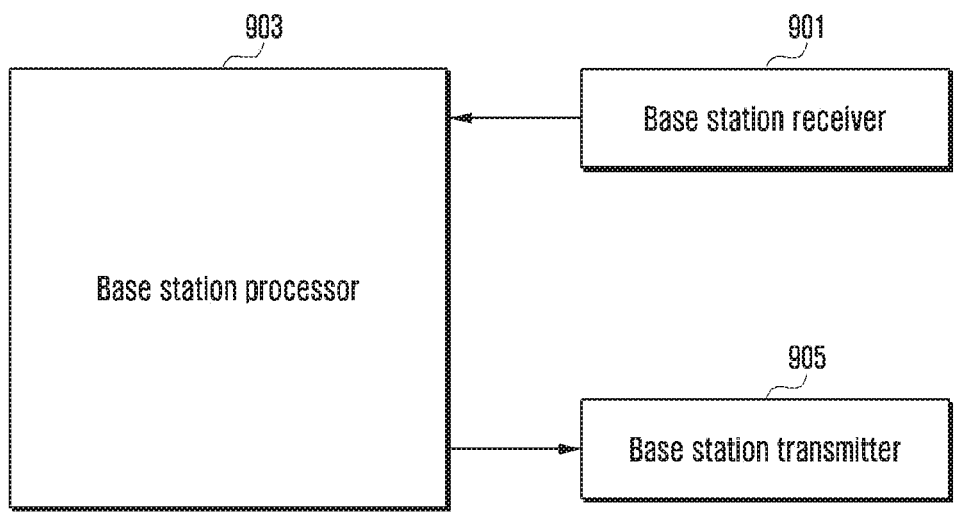
FIG. 9 is a block diagram illustrating an internal structure of a base station according to an embodiment of the disclosure.

In order to perform the above-described embodiments of the disclosure, a transmitter, a receiver, and a processor of the terminal and the base station are each shown in FIGS. 8 and 9. In order to perform the operation of determining the PUSCH transmission timing according to the disclosure, a method for transmitting/receiving a base station and a terminal are shown. To perform this operation, the receiver, the processor, and the transmitter of the base station and the terminal should each be operated according to the various embodiments of the disclosure.

FIG. 8 is a block diagram illustrating an internal structure of a terminal according to an embodiment of the disclosure.

Referring to FIG. 8, the terminal according to the embodiment of the disclosure may include a terminal receiver 800, a terminal transmitter 804, and a terminal processor 802. The terminal receiver 800 and the terminal transmitter 804 are collectively referred to as a transceiver in the embodiment of the disclosure. The transceiver may transmit/receive a signal to/from the base station. The signal may include control information and data. To this end, the transceiver may include an RF transmitter that up-converts and amplifies a frequency of the transmitted signal, an RF receiver that low-noise-amplifies the received signal and down-converts the frequency, or the like. Further, the transceiver may receive a signal through a radio channel and output the received signal to the terminal processor 802 and transmit the signal output from the terminal processor 802 on the radio channel.

The terminal processor 802 may control a series process to operate the terminal according to the embodiment of the disclosure as described above. For example, the terminal receiver 800 receives a signal including a control signal, and the terminal processor 802 may set a value of a timing offset field used for PUSCH transmission timing setting. Thereafter, if the terminal transmitter 804 needs to transmit a second signal related to the control signal at the above timing, it transmits the second signal at a timing determined by the processor.

FIG. 9 is a block diagram illustrating an internal structure of a base station according to the embodiment of the disclosure.

Referring to FIG. 9, the base station of the disclosure may include a base station receiver 901, a base station transmitter 905, and a base station processor 903. The base station receiver 901 and the base station transmitter 905 are collectively referred to as a transceiver in the embodiment of the disclosure. The transceiver may transmit/receive a signal to/from the terminal. The signal may include control information and data. To this end, the transceiver may include an RF transmitter that up-converts and amplifies a frequency of the transmitted signal, an RF receiver that low-noise-amplifies the received signal and down-converts the frequency, or the like. Further, the transceiver may receive a signal on a radio channel and output the received signal to the base station processor 903 and transmit the signal output from the base station processor 903 on the radio channel. The base station processor 903 may control a series process to operate the base station according to the embodiment of the disclosure as described above. For example, the base station processor may be operated to perform the operation as shown in FIG. 6 and may control the transceiver.

In accordance with various embodiments of the disclosure disclosed in the specification and the accompanying drawings have been provided only as specific examples in order to assist in understanding the disclosure and do not limit the scope of the disclosure. That is, it is obvious to those skilled in the art to which the disclosure pertains that other change examples based on the technical idea of the disclosure may be made without departing from the scope of the disclosure. Further, each embodiment may be combined and operated as needed. For example, some of the first embodiment and the second embodiment of the disclosure are combined with each other to operate the base station and the terminal. In addition, although the above various embodiments of the disclosure are presented on the basis of the LTE and LTE-A system, other modifications based on the technical idea of the embodiment may be applicable to other systems such as the 5G or NR system.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for transmitting an uplink signal performed by a terminal in a communication system, the method comprising:

receiving, from a base station, configuration information on a latency reduction mode, the configuration information on the latency reduction mode indicating whether the latency reduction mode is configured to the terminal;

receiving, from the base station, downlink control information scheduling an uplink data; and transmitting, to the base station, the uplink data on a physical uplink shared channel (PUSCH) using an unlicensed band based on the downlink control information, wherein the downlink control information includes an information field with 4-bit size indicating a timing offset, wherein a timing of transmission of the uplink data is determined based on a sum of n+3 and the timing offset in case that the latency reduction mode is configured to the terminal, where an index of a subframe in which the downlink control information is received is n, and wherein the uplink data is transmitted at one of subframes of which indices are from n+3 to n+18 in case that the latency reduction mode is configured to the terminal.

2. The method of claim 1, wherein the timing offset corresponds to one of 0 to 15.

3. The method of claim 1, wherein the downlink control information corresponds to a downlink control information format 0A, 0B, 4A or 4B.

4. The method of claim 1,
wherein a timing of transmission of the uplink data is determined based on a sum of n+4 and the timing offset in case that the latency reduction mode is not configured to the terminal, where an index of a subframe in which the downlink control information is received is n, and
wherein the uplink data is transmitted at one of subframes of which indices are from n+4 to n+19 in case that the latency reduction mode is not configured to the terminal.

5. A method for receiving an uplink signal performed by a base station in a communication system, the method comprising:
transmitting, to a terminal, configuration information on a latency reduction mode, the configuration information on the latency reduction mode indicating whether the latency reduction mode is configured to the terminal;
transmitting, to the terminal, downlink control information scheduling an uplink data; and
receiving, from the terminal, the uplink data on a physical uplink shared channel (PUSCH) using an unlicensed band based on the downlink control information,
wherein the downlink control information includes an information field with 4-bit size indicating a timing offset,
wherein a timing of transmission of the uplink data is determined based on a sum of n+3 and the timing offset in case that the latency reduction mode is configured to the terminal, where an index of a subframe in which the downlink control information is transmitted is n, and
wherein the uplink data is received at one of subframes of which indices are from n+3 to n+18 in case that the latency reduction mode is configured to the terminal.

6. The method of claim 5, wherein the timing offset corresponds to one of 0 to 15.

7. The method of claim 5, wherein the downlink control information corresponds to a downlink control information format 0A, 0B, 4A or 4B.

8. The method of claim 5,
wherein a timing of transmission of the uplink data is determined based on a sum of n+4 and the timing offset in case that the latency reduction mode is not configured to the terminal, where an index of a subframe in which the downlink control information is transmitted is n, and
wherein the uplink data is transmitted at one of subframes of which indices are from n+4 to n+19 in case that the latency reduction mode is not configured to the terminal.

9. A terminal transmitting an uplink signal in a communication system, the terminal comprising:
a transceiver; and
at least one processor coupled with the transceiver and configured to:
receive, from a base station via the transceiver, configuration information on a latency reduction mode, the configuration information on the latency reduction mode indicating whether the latency reduction mode is configured to the terminal,
receive, from the base station, downlink control information scheduling an uplink data, and
transmit, to the base station, the uplink data on a physical uplink shared channel (PUSCH) using an unlicensed band based on the downlink control information,
wherein the downlink control information includes an information field with 4-bit size indicating a timing offset,
wherein a timing of transmission of the uplink data is determined based on a sum of n+3 and the timing offset in case that the latency reduction mode is configured to the terminal, where an index of a subframe in which the downlink control information is received is n, and
wherein the uplink data is transmitted at one of subframes of which indices are from n+3 to n+18 in case that the latency reduction mode is configured to the terminal.

10. The terminal of claim 9, wherein the timing offset corresponds to one of 0 to 15.

11. The terminal of claim 9, wherein the downlink control information corresponds to a downlink control information format 0A, 0B, 4A or 4B.

12. The terminal of claim 9,
wherein a timing of transmission of the uplink data is determined based on a sum of n+4 and the timing offset in case that the latency reduction mode is not configured to the terminal, where an index of a subframe in which the downlink control information is received is n, and
wherein the uplink data is transmitted at one of subframes of which indices are from n+4 to n+19 in case that the latency reduction mode is not configured to the terminal.

13. A base station receiving an uplink signal in a communication system, the base station comprising:
a transceiver; and
at least one processor coupled with the transceiver and configured to:
transmit, to a terminal via the transceiver, configuration information on a latency reduction mode, the configuration information on the latency reduction mode indicating whether the latency reduction mode is configured to the terminal,
transmit, to the terminal, downlink control information scheduling an uplink data, and
receive, from the terminal, the uplink data on a physical uplink shared channel (PUSCH) using an unlicensed band based on the downlink control information,
wherein the downlink control information includes an information field with 4-bit size indicating a timing offset,
wherein a timing of transmission of the uplink data is determined based on a sum of n+3 and the timing offset in case that the latency reduction mode is configured to the terminal, wherein an index of a subframe in which the downlink control information is transmitted is n, and
wherein the uplink data is received at one of subframes of which indices are from n+3 to n+18 determined based on the timing offset and transmission timing in case that the latency reduction mode is configured to the terminal.

14. The base station of claim 13, wherein the timing offset corresponds to one of 0 to 15.

15. The base station of claim 13, wherein the downlink control information corresponds to a downlink control information format 0A, 0B, 4A or 4B.

16. The base station of claim 13,
wherein a timing of transmission of the uplink data is determined based on a sum of n+4 and the timing offset in case that the latency reduction mode is not configured to the terminal, where an index of a subframe in which the downlink control information is transmitted is n, and
wherein the uplink data is transmitted at one of subframes of which indices are from n+4 to n+19 in case that the latency reduction mode is not configured to the terminal.

* * * * *